United States Patent [19]
Tuda et al.

[11] 4,105,937
[45] Aug. 8, 1978

[54] TEACH-IN METHOD AND APPARATUS FOR USE IN AN INDUSTRIAL ROBOT

[75] Inventors: Goro Tuda; Katsuhiko Shimizu, both of Kobe; Tudoi Murakami, Ashiya; Syouzi Nasu, Akashi, all of Japan

[73] Assignee: Kobe Steel, Ltd., Kobe, Japan

[21] Appl. No.: 689,125

[22] Filed: May 24, 1976

[30] Foreign Application Priority Data

May 23, 1975 [JP] Japan .................. 50-62239
Jan. 9, 1976 [JP] Japan .................. 51-2217

[51] Int. Cl.$^2$ .......................................... G05B 19/24
[52] U.S. Cl. ...................................... 318/568; 318/572
[58] Field of Search ............................ 318/568, 572

[56] References Cited
U.S. PATENT DOCUMENTS

| | | | |
|---|---|---|---|
| 3,159,778 | 12/1964 | Gavreau et al. | 318/568 |
| 3,648,143 | 3/1972 | Harper | 318/568 |
| 3,727,119 | 4/1973 | Stanley et al. | 318/568 |
| 3,838,211 | 9/1974 | Joannou | 318/568 X |

*Primary Examiner*—B. Dobeck
*Attorney, Agent, or Firm*—Oblon, Fisher, Spivak, McClelland & Maier

[57] ABSTRACT

In a teach-in operation, the working procedure is memorized in an industrial robot in advance of the actual working operation, and the teaching is accomplished by manually guiding the tracing tip of the robot arm along a desired path. The teach-in method comprises the step of attaching, to the end of the arm, the tracing tip having at least a displacement pulse oscillator, which consists of a projector and a phototransistor, and a roller provided with gaps such as holes or slits, the projector and phototransistor being arranged in concentric positions with respect to the respective gaps of the roller so as to form an optical axis between the two optical elements. The tracing tip is then moved along a desired path, so that the location signal of the tracing tip may be obtained by the displacement pulse oscillator, whenever the roller is rotated a certain distance, as a result of the movement of the tracing tip, and such a location signal is memorized in a memory. The tracing tip is then exchanged for a working tip at the end of the arm; and playing back said location signal, such that the working tip is automatically traced along the predetermined desired path by the memorized location signal, whereby the velocity of the working tip is freely determined independently of the teaching velocity of the tracing tip.

Also disclosed is an apparatus for practicing the foregoing teach-in method.

3 Claims, 14 Drawing Figures

TEACH-IN METHOD AND APPARATUS FOR USE IN AN INDUSTRIAL ROBOT

BACKGROUND OF THE INVENTION

1. Field Of The Invention

The present invention relates generally to industrial robots, and more particularly to a method and apparatus for controlling the robot so as to perform predetermined operations.

2. Description of The Prior Art

In an industrial robot, generally speaking, a teach-in operation for memorizing the working procedure is accomplished in advance of the actual working operation.

This teach-in operation is usually carried out by manually guiding the working arm of the robot along a desired path on an article to be worked, so as to memorize the working procedure.

After the teach-in operation, the robot accomplishes the playback, that is to say, effects the actual working operation on the article in accordance with the memorized working procedure. In accordance with the kinds of working operations, more specifically, the industrial robot is divided into two type, one of which requires only the location control, and the other of which additionally requires the velocity control. Thus, the operating method of a robot is determined in accordance with the working operations considered.

In one of the most relevant prior art disclosures, for example, U.S. Pat. No. 3,648,143 issued to Harper et al. there is disclosed an arm element articulated at a mounting point externally of a base for movement thereon. The arm is formed of segments articulated at their junctions. A finger is articulated for movement toward and away from the distal arm segment and electrical motors are positioned at each of the articulation points for movement control of the arm segments and the finger element respectively. In operation, the operator places his own arm and finger over the arm segment, and finger. The operator then manipulates or moves the arm segments and finger to perform the function normally performed by the operator in his daily work routine. As the motors are actuated through a worm gear mechanism, the direction, speed, and duration of each rotation of each motor is recorded on tape in the form of a suitable signal. In response to playback of the tape, the motors cause the arm and fingers to perform precisely the functions accomplished when they were secured to the arm and fingers of the operator.

In the case, however, where the location signal and the velocity signal are to be recorded simultaneously, the quality of the playback or actual operation depends upon that of the teach-in operation. For instance, if the operator moves the arm at an instable velocity, the arm will operate at the instable velocity in the actual working operation, too, and this means it is impossible to obtain satisfactory results. In order to obviate this drawback, therefore, there has been proposed a method in which a roller and a drive mechanism are provided at a leading end of the arm when in the teach-in operation so that the roller may be rotated at a predetermined velocity by the driving force of the motor so as to move along a desired path.

Moreover, the velocity control becomes important especially in the case of a welding operation in which a desired velocity along a path is precisely controlled for the parts having a complex construction and shape so as to follow any inclusive curve and to respond to a velocity change in the course of the operation. Since, however, the operating space inherent in the robot is three-dimensional, it has been difficult to detect the linear velocity of the tracing tip of the arm. Thus, a method is conceivable wherein the movements at the respective degrees and freedom of the robot are appropriately considered and the corresponding linear velocity is calculated. This method is, however, found impractical because the calculation formula for the linear velocity takes a complicated form requiring a long calculation time period. This is a result of the fact that the robot has five to seven degrees of freedom, that most of the coordinate systems are cyclindrical or spherical, and that the robot has such an articulated mechanism, using links, as to provide a mutually interfering system.

In place of the complicated calculation method as noted above, another method has also been proposed, in which an equidistantly marked tape is adhered to the desired working path when in the teach-in operation, and in which the location signal finely divided by the teach-in operation at the respective mark points is recorded and reproduced so as to command the preset velocity in each of the finely divided positions. In this method, however, it takes a considerable time period to accomplish such a complicated operation as attachment of the tape. For a path of complex curves, moreover, it is difficult and takes a long time period, to accomplish the working operation. Thus, the second method can neither expect sufficient precision nor be practically suitable.

As seen from the above discussion, a variety of proposals and practices have been found for the location control method for use in an industrial robot. For the attempt to accomplish the location control and the velocity control simultaneously, the conventional control method, which has been proposed, becomes complicated, requires high skills for the actual operation, and takes an increased number of steps due to the difficulty in the velocity control in the case where a high precision is required.

SUMMARY OF THE INVENTION

The present invention relates to teach-in method and apparatus for use in an industrial robot, which can solve the above problems of the prior art.

It is, therefore, a primary object of the present invention to provide a teach-in method and apparatus for use in an industrial robot, which can accomplish the teach-in operation with ease and within a reduced time period even for a desired path having a complex pattern and which can also flexibly accomplish the actual working operations in a precise but prompt fashion.

Another object of the present invention is to provide a teach-in method and apparatus for use in an industrial robot, in which the velocity control can be freely accomplished, when in the actual working operations, independently of the teach-in conditions, together with the location control.

According to a feature of the present invention, therefore, there are provided a teach-in method and apparatus, in which the working procedure is memorized in an industrial robot in advance of the actual working operation, and the teaching is accomplished by manually guiding the tracing tip of the robot arm along a desired path. The teach-in method comprises the steps of: attaching, to the end of the arm, the tracing tip having at least a displacement pulse oscillator, which consists of a projector and a phototransistor, and a roller provided with gaps such as holes or slits, the projector and phototransistor being arranged in concentric positions with respect to the respective gaps of the roller so as to form an optical axis between the two optical elements; moving the tracing tip along a desired path, so that the location signal of the tracing tip may be obtained by the displacement pulse oscillator whenever the roller is rotated a certain distance as a result of the movement of the tracing tip, and memorizing the location signal in a memory device; exchanging the tracing tip for a working tip at the end of the arm; and playing back the location signal, such that the working tip is automatically traced along the predetermined desired path by the memorized location signal, whereby the velocity of the working tip is freely determined independently of the teaching velocity of the tracing tip.

In a teach-in apparatus exemplifying the present invention, moreover, the tracing tip includes an insertion member removably attached to the leading end of the robot arm, a rotating member attached rotatably on its axis to the other end of the insertion member, and a rocking member attached to the rotating member through a rocking drive means and equipped at its leading end with the displacement pulse oscillator.

More specifically, the displacement pulse oscillator according to an essential feature of the present invention has such construction that a number of holes or slits are formed at an equal distance about the roller, and that, at the leg of a supporting member which supports the roller at both sides thereof, there are embedded a projector and a phototransistor which are arranged in concentric positions with respect to the holes or slits of the roller so as to form an optical axis between the two optical elements. There is also provided a teach-in apparatus in which the rocking drive means includes a worm gear mechanism.

BRIEF DESCRIPTION OF THE DRAWINGS

Other objects and advantages of the present invention will become apparent from the following description when taken in conjunction with the accompanying drawings, wherein.

DETAILED DESCRIPTION OF THE ILLUSTRATED PREFERRED EMBODIMENTS

Although the following explanation of the present invention will be concerned mainly with an embodiment of a welding robot, the present invention should not be considered to be restricted thereto. Upon considering the description of the present invention, its essential features will be explained under the following items: (I) Displacement pulse Oscillator; (II) Teach-in Operation by Displacement Pulse Oscillator; and (III) Playback Operation, and then the embodiments of the present invention will be described in detail.

(I) Displacement Pulse Oscillator

Figures 1, 2, 3:
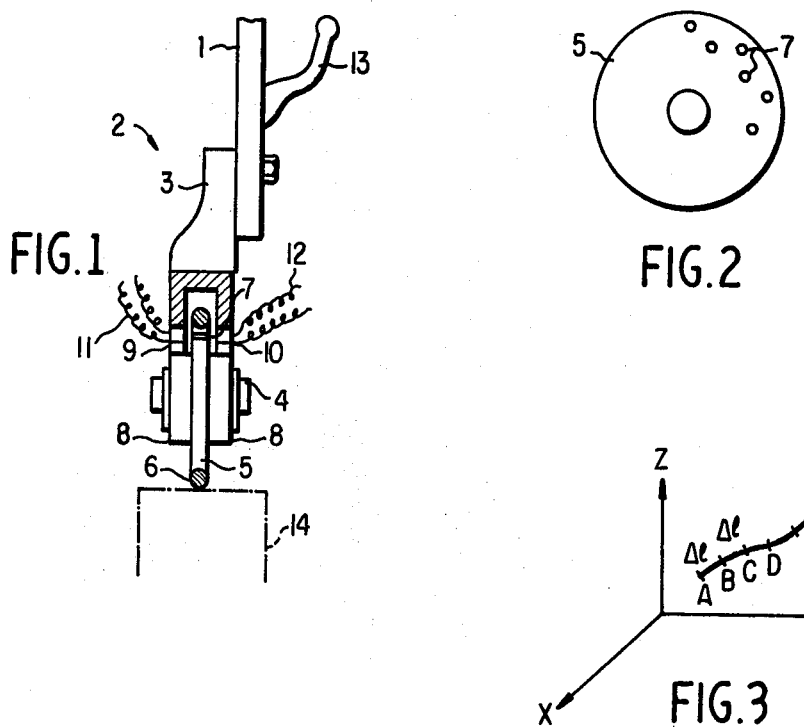
FIG. 1 is an enlarged schemtic drawing, partly in section, showing the details of a displacement pulse oscillator.
FIG. 2 is a side view of a roller as shown in FIG. 1.
FIG. 3 is a diagram showing one example of a desired working path.

Generally indicated at reference numeral 2 in FIG. 1 is a tracing tip, having a displacement pulse oscillator, which is removably attached to the leading end of an arm 1 of an industrial robot for the teach-in purpose. The displacement pulse oscillator includes a roller 5, which is rotatably supported on a supporting member 3 by means of a pin 4. A rubber ring 6 is fitted on the outer periphery of the roller 5 so as to prevent the same from slipping. On the side of the roller 5, as shown in FIG. 2, there are formed a number of holes 7 which are equidistantly arranged along concentric circles. Within the legs 8 of the supporting member 3 supporting the roller 5 at both sides thereof, there are embedded a projector 9 and a phototransistor 10, which are arranged in concentric positions with the holes 7 of the roller 5, so as to provide an optical axis between the two optical elements 9 and 10. The projector 9 is connected with a power source lead 11 while the phototransistor 10 is similarly connected with a signal lead 12. With these construction arrangements, when the roller 5 rotates, the positions of the holes 7 will intercept the optical axis, so that the electric pulses may be produced each time there is an interception.

The number of holes 7 is determined by the pitch intervals. These intervals are usually segments which are divided from a desired path into such segments as can be deemed a straight line, and a more detailed discussion will be made with reference to FIG. 3. The welding path or locus ($l$) to be followed is so arranged that one pulse is produced for the displacement of a segment ($\Delta l$) which can be considered straight. Then, the following relationship is obtained, if the number of holes be designated (N) and the diameter of the roller be (D):

$$\Delta l = \pi D/N$$

In this equation, it is necessary that the displacement should have a small roller diameter (D) and a large value of the number of holes (N) for a small segment ($\Delta l$). This requirement can be easily satisfied, as seen from FIG. 2, by the construction that the arrangement of the holes is formed into two rows displaced a half pitch from each other and that two sets of projectors 9 and phototransistors 10 be provided.

(II) Teach-in Operation

When the teach-in operation is to be accomplished by the use of the tracing tip 2, the tracing tip 2 is attached to the leading end of the arm 1. Then, a handle grip 13 is manually actuated so that the roller 5 may turn on a weldment 14 along the desired welding path so as to effect the tracing operation.

Figure 4:
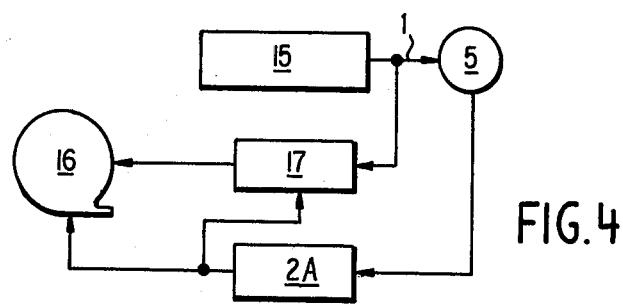
FIG. 4 is an explanatory block diagram showing a teach-in operation.

As the result of the turning motion of the roller 5, the desired pulses are generated at the respective points A, B, C, D ---, which are formed by dividing the locus ($l$) into the segments ($\Delta l$), as shown in FIG. 3, and at the same time the respective degrees of freedom of the robot arm 1 at those pulse generating points are recorded as a location signal. FIG. 4 shows a control circuit for the teach-in operation. As the roller 5 at the leading end of the arm 1 of the robot 15 turns, the pulses generated in the displacement pulse oscillator 2 are recorded in a data memory 16. On the other hand, the displacements at the respective degrees of freedom of the robot arm 1 at the pulse generating points are also recorded as a location signal in the data memory 16 by way of a location sensor 17, which is mounted in the operating actuator of the robot arm 1. More specifically, in the case where the degrees of freedom are five, the location signal at the point (A) is dictated by $x_a$, $y_a$, $Z_a$, $X_a$ and $Y_a$, while the location signal at the point (B) is dictated by $x_b$, $y_b$, $Z_b$, $X_b$ and $Y_b$. Thus, the location signals are consecutively recorded at every segment ($\Delta l$).

(III) Playback Operation

Figure 5:
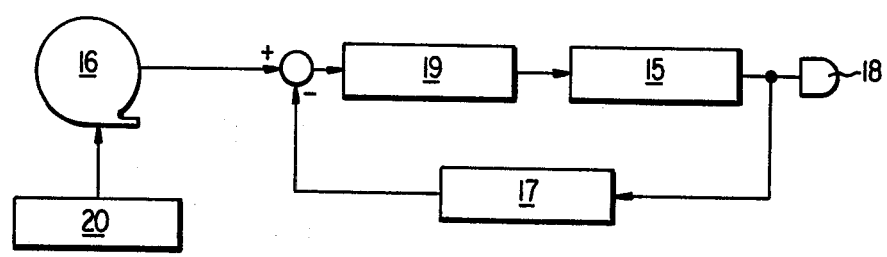
FIG. 5 is an explanatory block diagram showing a playback operation.

After the program of the welding locus is recorded in the robot by the teach-in operation described above, the robot is brought into operation in accordance with that program so as to accomplish the desired welding operation. This playback operation will now be discussed with reference to FIG. 5. Upon the playback operation, the tracing tip is removed from the leading end of the robot arm 1 and is then replaced by a welding torch 18 acting as a working machine in this instance, thus producing a closed loop location control system. The location signals at the respective points, which are recorded in the teach-in operation at the intervals of the segments ($\Delta l$), are supplied, as a command signal at every time interval ($\Delta t$), to the robot 15 by way of a computer 19. Then, the velocity at this time is expressed by the following equation:

$$V = \Delta l / \Delta t$$

It will be understood that the velocity thus expressed can be controlled to a desired value. The velocity level (V) set by the above equation is introduced into a velocity controller 20, and the robot 15 can accomplish the welding operation at the desired velocity along the instructed welding locus. In the case, on the other hand, where a velocity change is required in the course of the welding operation, it can be effected with ease by a command signal which changes the preset velocity level. This velocity change can be freely accomplished independently of the teaching velocity of the roller.

Figure 6:
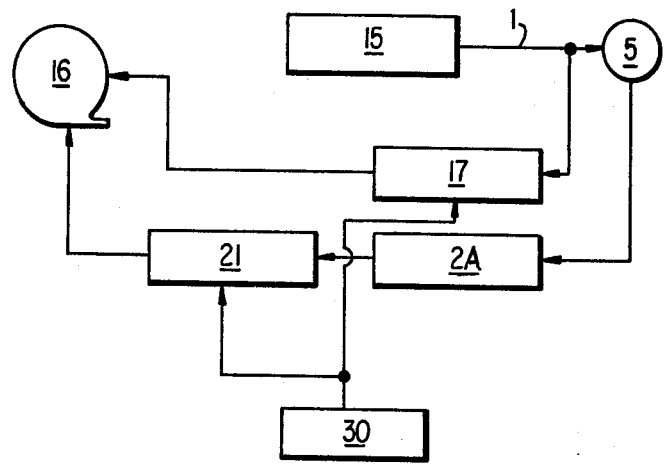
FIG. 6 is also an explanatory block diagram showing another example of the teach-in operation.

FIG. 6 shows another embodiment of a control circuit for accomplishing the teach-in and playback operations. In this embodiment, the pulses of the displacement pulse oscillator 2 are accumulated during the teach-in operation, and the velocity control is accomplished by memorizing not only the location signals at the respective degrees of freedom, but also the accumulated pulses at predetermined time intervals. This embodiment is the most efficient especially in the case where the memory cannot follow the reading velocity of the data.

In the teach-in operation, the roller 5 at the leading end of the arm 1 of the robot 15 is made to turn along the desired welding path, so that the integrated pulses, which are produced by integrating the pulses produced in the displacement pulse oscillator 2 along the whole length of the path by the use of a counter 21, may be memorized in the data memory 16 at every predetermined time interval ($T_a$) by the command of a later-described timer 30 of the computer. Simultaneously, the location signals ($x_n$, $Y_n$, $z_n$, $X_n$, $Y_n$, $Z_n$) at the respective degree of freedom are memorized at every predetermined time interval ($T_a$) in the memory.

In this way, the playback operation is carried out by the program which is prepared by memorizing the accumulated pulses in the teach-in operation and the location signals. Then, the displacement ($\Delta l n$) at the predetermined time interval ($T_a$) is obtained by the number of pulses ($P_n$) from the following equations, the symbol ($Kl$) expressing the displacement for one pulse:

$$\Delta P_n = P_n - P_{n-1}$$

$$\Delta l_n = Kl\Delta P_n = Kl(P_n - P_{n-1})$$

Accordingly, the following relationship holds between the preset velocity and the time interval ($TP_h$), during which the location signal is produced:

$$V = \Delta l_n / TP_n$$

Thus, the location signal at the respective degrees of freedom, which have been memorized at the time interval ($T_a$) during the teach-in operation, are introduced as a command signal into the controller at the time intervals ($TP_n$) during the playback operation. As a result, the velocity, which is established in the displacement ($\Delta l_n$) during the desired sampling operation, can be controlled freely to a predetermined level.

One embodiment of a welding robot machine, to which the control method according to the present invention is applied, will now be described as follows.

Figure 8:
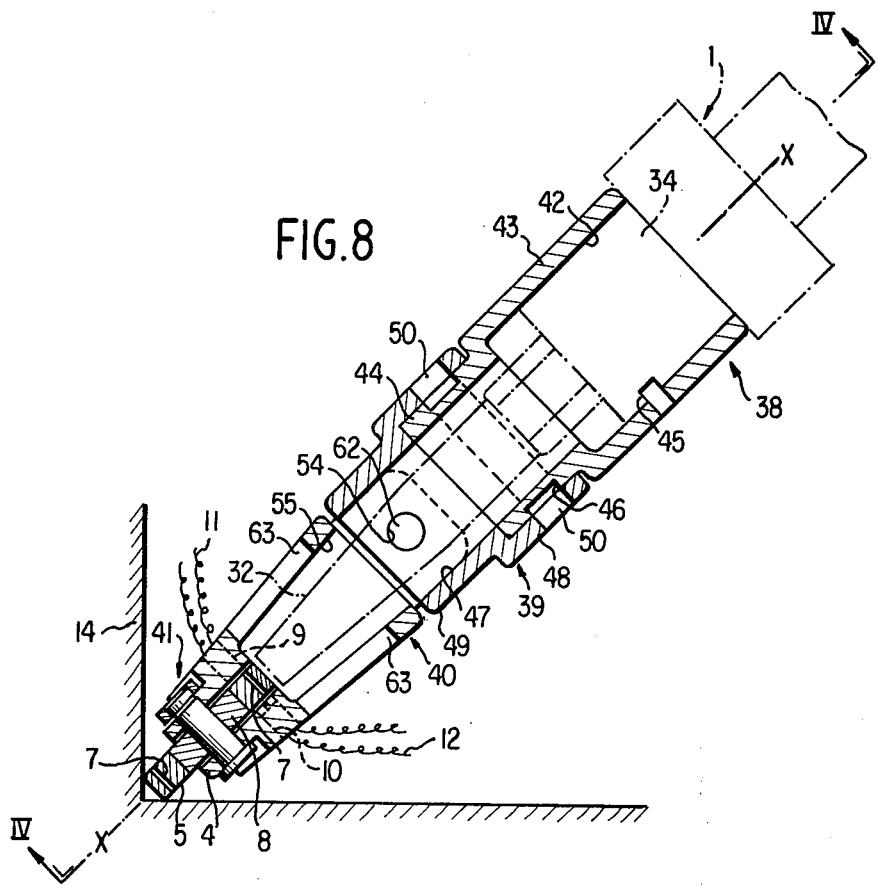
FIG. 8 is a cross-sectional view showing one embodiment of the tracing tip according the present invention.
Figure 9:
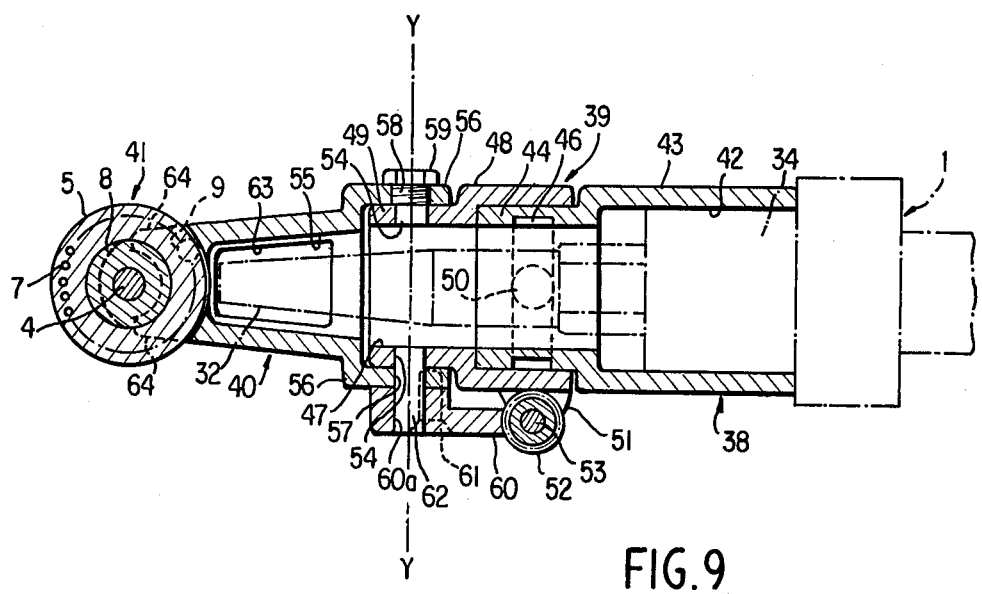
FIG. 9 is a cross-section taken along the line IV—IV of FIG. 8.
Figure 7:
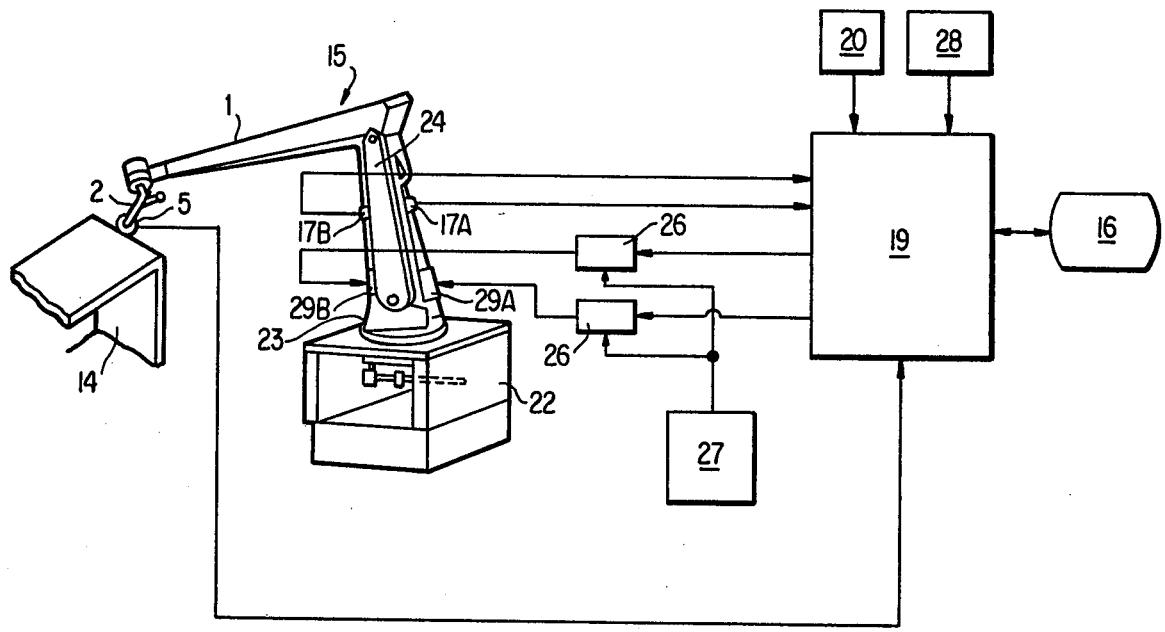
FIG. 7 is schematic diagram showing one embodiment of a welding robot, to which the control method according to the present invention is applied.
Figure 10:
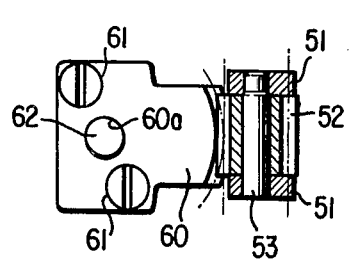
FIG. 10 is a top plan view, partly in section, showing the meshing condition of the worm and worm wheel as shown in FIG. 9.

FIG. 7 is a generally diagrammatical view showing the welding robot machine of the present invention, and FIGS. 8 to 10 show one embodiment of a tracing tip which can be removably attached to the leading end of the arm of the robot machine.

In FIG 7, the robot 15 generally includes an upright arm 24, which is made to stand on a base 22 through a turning disk 23, and the arm 1 which is supported on the leading end of the upright arm 24. In the teach-in operation, as shown in FIG. 7, the tracing tip 2 is removably attached to the leading end of the arm 1, so that the roller 5 may turn on the welding locus of the weldment 14 as a result of the manual operation of the handle grip 13. In the playback operation, on the other hand, the tracing tip 2 is removed, and the welding torch is attached in place thereof.

When it is intended to accomplish the welding operation by the use of the welding robot 15, the control circuit as shown is used. Although the servo system usually comprises six systems (or six degrees of freedom) when employed in the welding operation, only two systems are shown for simplification of the explanation. Indicated at reference numerals 19, 16, 17A and 17B, 26, 27, 20 and 28 are the control circuit elements including a computer, the data memory, the location sensors, servo valves, a hydraulic power supply unit, the velocity controller, and a program memory, respectively. In this program memory 28, there are memorized a series of control programs comprising the reading of the location signals from the location sensor 17, the data transfer to the data memory 16, and the command outputs to the servo valve 26 and the hydraulic power supply unit 27 of the robot.

In FIGS. 8, 9 and 10, the tracing tip is composed generally of an insertion member 38, a rotating member 39, a rocking member 40, and a displacement pulse oscillator 41.

The insertion member 38 is shaped as a cylinder which is provided with an axial through bore 42 and which is composed of an enlarged portion 43 and a reduced portion 44. A pin 45 is in the wall of the enlarged portion 43 in such a manner as to project inwardly into bore 42, while a groove portion 46 is formed about the outer periphery of the reduced portion 44. The enlarged portion 43 is fitted over a front body member 34, from which the nozzle at the leading end of the welding torch is removable. A pin 45, which is made to project inwardly from the wall 43 defining the through bore 42, is rotatably fitted in the spiral groove which is formed in the outer periphery of the front body 34, so that it may be removably secured to the front body 34.

Moreover, the rotating member 39 is formed with axial through bore 47 and is divided into an enlarged portion 48 and a reduced portion 49. Pins 50 are in the wall of the enlarged portion 48, in positions dividing the inner periphery into two halves 1 in such a manner as to extend inwardly. A worm 52 is rotatably supported through means of a shaft 53 on a bracket 51 which is mounted on the outside of the enlarged portion 48. At both sides of the reduced portion 49, there are formed radial through bores 54 which are disposed so as to face each other and to extend from the outside into the through bore 47. The enlarged portion 48 of the rotating member 39 is fitted over the outside of the reduced portion 44 of the insertion member 38, and at the same time, the pins 50 are fitted in the groove portion 46, which is formed in the outer periphery of the reduced portion 44 of the insertion member 38, so that the rotating member 39 may turn relative to the insertion member 38.

The rocking member 40 is made to have a converging or tapered configuration and is provided with an axial through bore 55. A pair of brackets 56 are mounted in a facing manner upon the larger end portion of the rocking member 40. One of these brackets 56 is formed with a non-threaded radial bore 57 and the other bracket is formed with a threaded bore 58. To one of the brackets 56, there is secured, by means of a small screw, a radial worm wheel 60 is formed with a bore 60a. At the middle portion of the rocking member 40, there are formed radially disposed rectangular bores 63 which are arranged in a facing manner in a direction perpendicular to the axes of the bores 57 and 58 formed in the brackets 56. The roller 5 equipped with the bearing 8 is rotatably supported on the leading end portion of the rocking member 40 by means of the shaft 4. Within concentric circles in the vicinity of the outer peripheral portion of the roller 5, there are formed a number of holes 7 which are arranged equiangularly thereabout and which pass through roller 5 in the axial direction. Within the supporting portions 64 upon both sides of roller 5 for supporting the same, there are embedded the projector 9 and the phototransistor 10 which are arranged in concentric positions with respect to the holes 7 of the roller 5. The projector 9 is connected with the power source lead 11, while the phototransistor 10 is connected with the signal lead 12. As a result, an optical axis is formed between the two optical elements 9 and 10, so that the electric pulses may be produced whenever the holes 7 intersect the optical axis upon rotation of the roller 5. The brackets 56 of the rocking member 40 are fitted on the outside of the reduced portion 49 of the rotating member 39. The threaded bore 58 of one of the brackets 56 is aligned with the bore 54, which is formed in the reduced portion 49, and a bolt 59 is screwed into the aligned bores. The bore 57 of the other bracket 56 is aligned with the bore 60a of the worm wheel 60, and a pin 62 is fitted in the aligned bores so that the rocking member 40 is connected in a rocking manner relative to rotating member 39, by screws 61. The worm wheel 60, which is secured to one of the brackets 56, is made to mesh with the worm 52 which is supported on the rotating member 39. Thus, the rocking member 40 is made such that it can rock on the axis Y—Y of the pin 62 and the bolt 59 when the worm 52 turns. The tip and the front body 34 of the welding torch are fitted in the respective through bores 42, 47 and 55 of the tracing tip thus constructed.

At first, when the welding path is to be taught in the robot, the nozzle is turned and removed from the front body 34 at the leading end of the welding torch under the condition in which the grip portion of the torch is normally grasped by the arm of the robot. Then, the insertion member 38 of the tracing tip is fitted on the front body 34, and the pin 45 mounted in the enlarged portion 43 of the member 38 is fitted in the spiral groove portion of the front body 34 and turned. In this way, the tracing tip is easily mounted in the end of the arm of the robot. As has already been discussed, the teach-in operation is carried out such that the pulse signals, which have been produced at the predetermined intervals of 1 to 2 mm in the displacement pulse oscillator by turning the roller 5 on the trace surface of the weldment 14 while operating the tracing tip, are converted into a starting signal, into which the desired location data is read. The control circuit 19 having a computer of FIG. 7 will start sampling the location data of the location sensor 17, when the starting signal is produced, so as to allow the data memory 16 to accomplish its memorizing operation.

The location data in this case are those at the respective degrees of freedom at the leading end of the arm 1, which are detected by the location sensors 17A and 17B. These sensors 17A and 17B are mounted in cylinders 29A and 29B, which are suitably arranged between the upright arm 24 and the turning disc 23 as best seen in FIG. 7.

Figure 11:
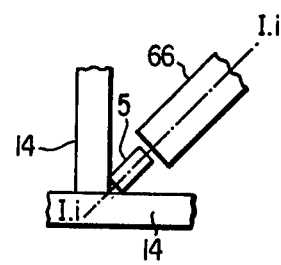
FIGS. 11, 12 and 13 are schematic side views showing the positional relationship between the center line of the roller and the axis of the leading end of the welding torch when in the teach-in operation of FIG. 8.
Figure 12:
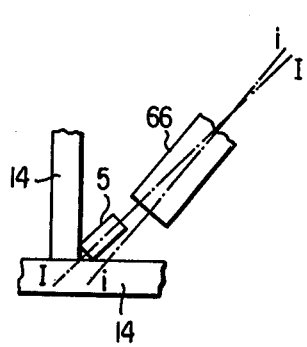
Figure 13:
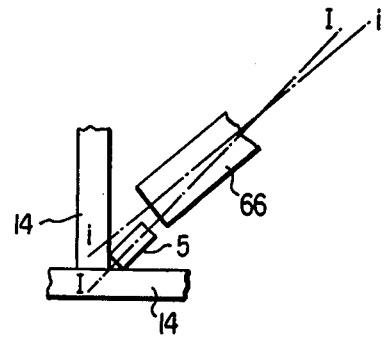

In this teach-in operation, where the welding trace is of an articulate direction or of an abruptly changing direction, the rotating member 39 will turn in response thereto about the line X — X of FIG. 8 relative to the insertion member 38, so that the axial line $i - i$ at the leading end of a welding torch 66 may be aligned, as shown in FIG. 11, with the center line $I - I$ of the roller 5, thus allowing the roller 5 to turn along the welding path. In the case, on the other hand, where any variation in the thickness and padding of the weldment 14 are required or where it is intended to accomplish the welding operation even on a surface which is not suitable for the rotation of the roller, the worm 52 is rotated in response thereto so that the rocking member 40 may turn about the pin 62 and the bolt 59 relative to the rotating member 39. As better seen from FIGS. 12 and 13, the roller 5 will move rotationally along the desired welding path while the axial line $i — i$ at the leading end of the welding torch 66 is appropriately displaced in any one of particular directions from the center line $I — I$ of the roller 5, and since the rocking member 40 is formed at both sides thereof with the bores 63, the tracing tip at the leading end of the welding torch can be easily displaced.

The desired welding operation is accomplished such that, after the welding path is memorized in the robot by the teach-in operation thus far described, the robot is brought into operation in accordance with the memory apparatus. For this purpose, the insertion member 38 is rotationally removed from the front body 34 at the leading end of the welding torch under the condition in which the welding torch is grasped in the arm of the robot just in the same manner as with the case of the teach-in operation. Then, the nozzle, which has been removed during the teach-in operation, is rotationally attached to the front body 34 in place of the insertion member 38.

The location data, which have been memorized in the data memory 16, are introduced as a command signal into the respective servo systems 26 by way of the control circuit 19 at the time intervals which are preset by the velocity controller 20. At the same time, the location data at the positions at that time are fed back from the location sensor 17, and as a result, the deviation calculation from the memorized data, and the servo control locational correction of the operating output levels or the like, are carried out.

The control of the welding path is accomplished in the process thus far described, and the control of the welding velocity is accomplished by the control method according to the present invention, in which the location data are recorded at each of the predetermined intervals which are divided from the welding path. If desired, the welding velocity can be variably preset on the basis of the welding design of the predetermined intervals of the welding path independently of the teach-in operation by determining the time intervals of the location data commanding operation with the use of the velocity controller 20.

Figure 14:
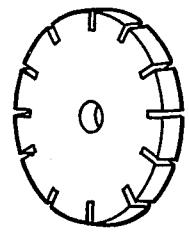
FIG. 14 is a perspective view showing another embodiment of the roller.

Although, in the above embodiment, the holes 7 are formed in the positions which are equiangularly disposed on the concentric circles in the vicinity of the peripheral edge portion of the roller, the roller structure should not be so limited to that embodiment but can be formed with equiangularly disposed notched grooves or radial slits formed on the outer peripheral side surface or the side of the roller 5 as shown in FIG. 14.

Moreover, the pulse generating construction may be either an optical detecting mechanism of transmission or a reflection type or a mechanism for producing pulses by a method such as of the magnetic, capacity or contact type whenever the roller is moved a predetermined distance.

As has been described in detail hereinbefore, the working efficiency and precision can be remarkably improved according to the velocity control method of the present invention. This is because the velocity control can be accomplished either in accordance with the working characteristics in the playback operation independently of the velocity in the teach-in operation or in such a free process, in which the velocity is reduced in the positions, where it is required to carry out the working operations especially carefully, but in which the velocity can be at a higher value at the remaining positions.

According to the present control method, moreover, since the sampling operation is accomplished at every distance interval by dividing the working path into fine segments, the capacity in memory of the memorizing device can be free from the teach-in time period. The working operation can be accomplished promptly but reliably according to the velocity control method of the present invention by the additional use of the sampling process at every time interval. This is because it is easily possible to effect the predetermined distance sampling process for the positions requiring the velocity control and to effect the predetermined time sampling process for the positions requiring no velocity control.

According to the velocity control apparatus of the present invention, still further, the displacement pulse oscillator is removed or attached, when in the teach-in operation, to the end of the arm of the robot by means of the insertion member, the rotating member and the rocking member, under the condition, in which the welding torch is grasped by the leading end of the robot arm, so that the displacement pulse oscillator may turn and rock. Thus, a complicated welding path or pattern can be correctly recorded in the robot even if its direction is arcuate or changes abruptly or requires multi-layered padding. Since, on the other hand, the tracing tip is replaced, when in the reproducing operation, by a nozzle so that the robot may accomplish the welding operation, the positional precision of the welding torch within a three-dimentional space can be augmented. Since, moreover, the teach-in and reproduction operations are accomplished by exchanging the nozzle and the tracing tip at the end of the arm of the robot, the two operations can be made with ease and within a shortened time period. Thus, the velocity control apparatus of the present invention can be efficient even in the production of articles which are produced in a small quantity but in various kinds. The apparatus according to the present invention can also be handled and maintained with ease because it is reduced in size and has a simple construction. Obviously, many modifications and variations of the present invention are possible in light of the above teachings. It is to be understood therefore that within the scope of the appended claims, the present invention may be practiced otherwise than as specifically described herein.

What is claimed is:

1. A teach-in method for use in an industrial robot, wherein the teaching is accomplished by manually guiding the tracing tip of a robot arm along a desired path, which method comprises the steps of:

attaching, to the end of the arm, the tracing tip having at least a displacement pulse oscillator, which consists of a projector and a phototransistor, and a roller provided with gaps such as holes or slits, said projector and said phototransistor being disposed at concentric positions with respect to the respective gaps of said roller so as to form an optical axis between the two optical elements;

moving the tracing tip along a desired path, so that a location signal of the tracing tip may be obtained by the displacement pulse oscillator whenever the roller is rotated a predetermined distance as a result of the movement of the tracing tip through respective degrees of freedom, and memorizing said location signal in a memory device;

exchanging the tracing tip for a working tip at the end of the arm;

playing back said location signal, such that the working tip is automatically traced along the predetermined desired path by means of the memorized location signal; and, independently controlling the velocity of the working tip with respect to the teaching velocity of the tracing tip.

2. A teach-in method according to claim 1, wherein the displacement location signal at the respective degrees of freedom is produced, whenever the location signal is produced by said pulse oscillator, so that both of the signals may be memorized in said memory in a correlated manner.

3. A teach-in method according to claim 1, wherein the location signals by said pulse oscillator are accumulated and the displacement location signal at the respective degrees of freedom is produced at a predetermined time interval, so that both of the signals may be memorized in said memory in a correlated manner.

* * * * *